(12) United States Patent
Capeau et al.

(10) Patent No.: US 8,366,938 B2
(45) Date of Patent: Feb. 5, 2013

(54) METHOD AND DEVICE FOR PURIFYING LIQUID EFFLUENTS

(75) Inventors: Patrice Capeau, Aix-en-Provence (FR); Michel Lopez, Coursan (FR); Pascal Gendrot, Jouy en Josas (FR)

(73) Assignee: Orege, Societe a Responsabilite Limitee (FR)

(*) Notice: Subject to any disclaimer, the term of this patent is extended or adjusted under 35 U.S.C. 154(b) by 757 days.

(21) Appl. No.: 12/595,058

(22) PCT Filed: Apr. 14, 2008

(86) PCT No.: PCT/FR2008/000521
§ 371 (c)(1),
(2), (4) Date: Nov. 10, 2009

(87) PCT Pub. No.: WO2008/142293
PCT Pub. Date: Nov. 27, 2008

(65) Prior Publication Data
US 2010/0126931 A1     May 27, 2010

(30) Foreign Application Priority Data
Apr. 13, 2007   (FR) ..................................... 07 02700

(51) Int. Cl.
C02F 1/24      (2006.01)
C02F 1/78      (2006.01)
C02F 1/72      (2006.01)
C02F 1/465     (2006.01)
C02F 1/467     (2006.01)

(52) U.S. Cl. ........ 210/703; 210/603; 210/707; 210/758; 210/759; 210/760; 210/143; 210/195.1; 210/221.2; 210/205; 210/206

(58) Field of Classification Search .................. 210/703, 210/603, 707, 758, 759, 760, 143, 195.1, 210/205, 206, 221.2
See application file for complete search history.

(56) References Cited

U.S. PATENT DOCUMENTS

| | | | | |
|---|---|---|---|---|
| 3,773,179 | A | * | 11/1973 | Hurst ............................ 210/194 |
| 3,898,150 | A | * | 8/1975 | Russell et al. ................ 204/270 |
| 4,673,443 | A | | 6/1987 | Fetty |
| 5,053,140 | A | * | 10/1991 | Hurst ............................ 210/704 |

(Continued)

FOREIGN PATENT DOCUMENTS

WO           01/38235 A     5/2001

OTHER PUBLICATIONS

International Search Report for PCT/FR2008/000521, completed Dec. 3, 2008, mailed Dec. 12, 2008.

*Primary Examiner* — Thomas M Lithgow
(74) *Attorney, Agent, or Firm* — Banner & Witcoff, Ltd.

(57) ABSTRACT

The invention relates to a method and a device for purifying liquid effluents, in which water is separated from substances by performing, in a single vertical enclosure (3), a vertical bubbling in the effluents fed at a flow rate d. The enclosure has a free surface and includes at least two compartments (4, 5, 6, 7) communicating together for enabling a circulation between the compartments successively from the top to the bottom and from the bottom to the top between the lower portion thereof and a medium level at a flow rate D at least three times higher than the flow rate d. The supernatant phase is continuously discharged and a hydraulic or gaseous chemical oxidation of said effluents is simultaneously carried out in the same enclosure, the chemical oxidation rate and the bubble flow rate and size being selected in order to progressively obtain a separation of the solid/liquid and liquid/liquid phases at the surface of the enclosure for obtaining a COD below a predetermined threshold.

25 Claims, 8 Drawing Sheets

U.S. PATENT DOCUMENTS 5,178,755 A * 1/1993 LaCrosse .................. 210/195.1
5,180,499 A * 1/1993 Hinson et al. ................ 210/706
5,308,480 A * 5/1994 Hinson et al. ............. 210/195.1
6,010,011 A * 1/2000 Rubinstein ................... 209/168
6,270,063 B1 8/2001 Carrillo
6,866,788 B1 3/2005 Baig et al.

* cited by examiner

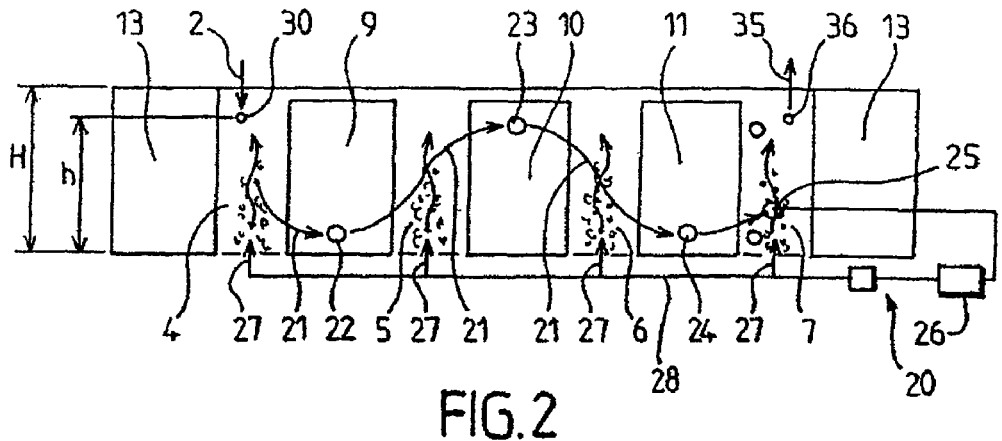
FIG.2
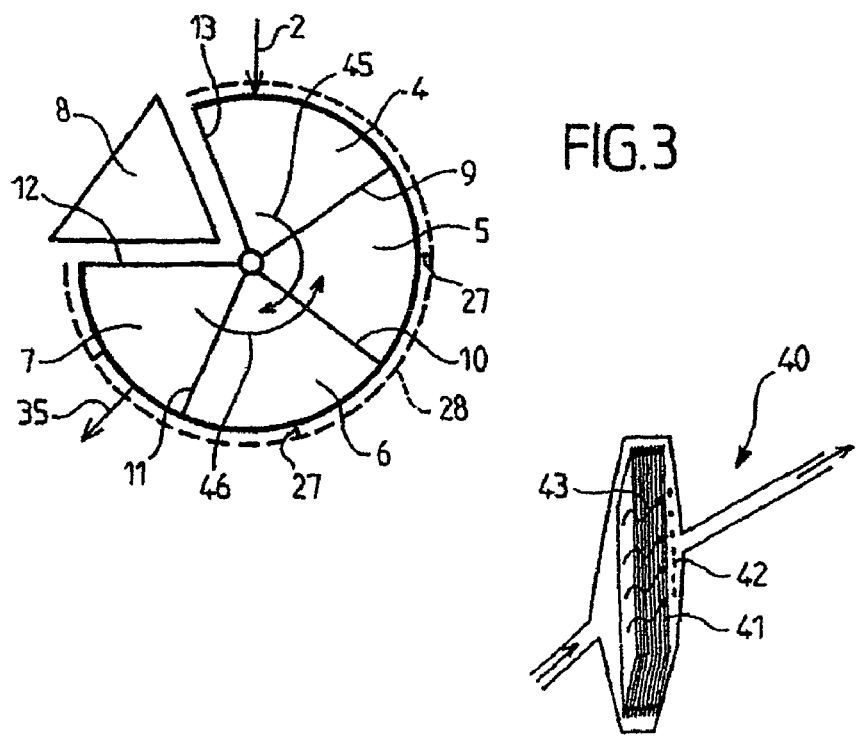
FIG.3
FIG.5

METHOD AND DEVICE FOR PURIFYING LIQUID EFFLUENTS

The present invention relates to a method for purifying liquid effluents charged with dissolved or undissolved organic and/or mineral substances, in order to bring them below a given COD and/or BOD by vigorous hydraulic agitation, oxidation and skimming.

It also makes it possible to lower the amount of TOC (total carbon) and of SM (suspended matter) to values below a given threshold.

The invention also relates to a device for purifying such effluents.

It finds a particularly significant, although not exclusive, application in the field of the purification of oil effluents or of effluents from processes for manufacturing products originating from agriculture, in particular effluents having a very high initial COD [(>30 000 mg $O_2$/l or mg/l by abuse of notation as used subsequently)], the carbon-based chains of which are long and circular, that is to say difficult to degrade. It also and for example makes it possible to carry out a treatment of the diffuse pollutions comprising complex molecules such as those of complex pesticides, or else of mixtures of hydrocarbons and seawater with a hitherto unequalled efficiency.

The COD or Chemical Oxygen Demand is the consumption of oxygen by strong chemical oxidants necessary for the oxidation of the organic (and mineral) substances of the water. It makes it possible to evaluate the pollution load of waste waters and measures all of the oxidizable substances, which includes those that are biodegradable.

The amount of matter that can be biodegraded by biochemical oxidation (oxidation by aerobic bacteria which take their energy from a redox reaction) contained in the water to be analyzed is, itself, defined by the parameter BOD (Biological Oxygen Demand).

It is known that liquid effluents, often qualified as waste waters and which constitute the main example thereof, are likely to contaminate the media into which they are released.

An excessively high COD or BOD of the effluents is harmful.

Specifically, the unbiodegradable matter that they contain are caused to be slowly oxidized by the dioxygen dissolved in the water or by that from the air at the surface of the effluent.

Since dissolved gaseous oxygen is essential to life, too high a demand in a river water, or at the surface of a body of water, will be harmful to animal and plant life, hence the need for treatment.

Many methods for treating waste waters and/or other effluents originating from chemical processes with a view to their release into the environment are already known.

These treatments may be carried out collectively in a treatment plant or individually.

Thus, there are treatment plants that make it possible to obtain acceptable COD and/or BOD values that allow release into the environment, especially by oxidizing treatment.

Such plants however have drawbacks.

Indeed, they require sites of large dimensions that must, in general, be located at a distance from inhabited areas, considering the emissions of annoying, or even toxic odors or aerosols. They furthermore have high operating costs and a limited efficiency, which is less and less acceptable considering the increase in regulatory requirements as far as release is concerned.

In particular, COD levels below 1000 mg/l, or even substantially below this value, are today increasingly demanded, which proves impossible to obtain in the case of certain effluents, for example effluents originating from factories that produce oils.

More complex devices and methods also exist, but these do not necessarily make it possible to obtain the desired performances, systematically requiring costly additives that themselves generate waste.

For example, a method is known (WO 01/38325) for purifying aqueous effluents by catalytic oxidation using a three-phase reactor through which the effluents can continuously pass, in which reactor the solid catalyst is kept in suspension by recycling it.

The reactor comprises two compartments, namely a first compartment in which the reactant is kept in suspension and the effluent is circulated by bubbling therethrough a carrier gas and a second compartment where the oxidation of the effluents is carried out by injection of ozone.

Such a reactor has, in the event of an increase of the bubbling flow rate, obstructions which therefore limit such a flow rate. It furthermore requires an organized discharge of the driving gas which interferes with good contact between catalyst and effluent.

It is therefore today common not to be able to achieve the levels required for release into the environment, which leads to the need to dilute the effluent with pure water before its release. Such a dilution, besides the fact that it is generally illegal, is not satisfactory, requires expensive pumping and recycling plants and does not make any difference quantitatively to the volume of troublesome effluents released.

Furthermore, in the case of particular recently appeared effluents, the conventional methods prove ineffective.

Therefore, for a long time there has been an unmet need for an effective, general, compact and non-polluting method for purifying liquid effluents.

The present invention aims to provide such a method, and a corresponding device for treating the effluents, that respond better than those known previously to the requirements of the art, especially in that it enables a compact, substantially less expensive and much more effective treatment than that obtained with the treatment plants of the prior art.

A great flexibility of operation of the device furthermore makes it possible to adapt it and to control it as a function of the type of effluent to be treated, which is never the same from one plant to another, which is an important advantage of the invention.

For this purpose, the invention essentially proposes a method for purifying liquid effluents charged with dissolved or undissolved organic and/or mineral substances, in order to bring them below a given COD threshold, in which the water is separated from the substances by carrying out, in one and the same vertical chamber that has at least two compartments, a vertical bubbling in the effluents introduced at a flow rate d, and simultaneously in the same chamber a hydraulic or gaseous chemical oxidation of said effluents, characterized in that the chamber having a free surface and comprising at least three compartments that communicate with one another in order to allow a circulation between compartments successively from the top to the bottom and from the bottom to the top and so on, the effluents are introduced on one side and are withdrawn from another side in the upper part of the chamber at said flow rate d, the effluents are circulated by means of an external hydraulic circuit through the compartments between their lower part and a middle level at an overall flow rate D at least three times higher than the flow rate d, and the supernatant phase is continuously discharged, the rate of chemical oxidation and also the flow rate and the size of the bubbles being selected in order to gradually obtain a separation of solid/liquid and/or liquid/liquid phases at the surface of the chamber that makes it possible to obtain a COD below the given threshold.

The circulation by means of an external hydraulic circuit makes it possible to reinject, where desired, the overall flow D, which will allow a great flexibility of operation as is described more precisely still below.

The continuous discharge of the supernatant phase itself clears the free surface of the reactor which can then act as a captor of the hydrophobic heads of the structures to be extracted.

It should be noted that a liquid/liquid separation is obtained during the presence of two or more immiscible liquids, and especially in the case of the presence of colloids.

Such a method will also make it possible, if necessary, to lower the BOD and/or the level of SM respectively below a second and a third given threshold.

It furthermore makes it possible to seek a BOD/COD ratio above a particular value, which is advantageous for then facilitating the biological decontamination.

The expression "middle level" should be understood to mean a level intermediate between the lower part of the compartment and the free surface of the effluents in the chamber, which level must at the very least be located below the inlet and outlet connections for the effluents at the flow rate d, for example slightly below (a few centimeters), or lower, for example slightly above the middle of the walls of the compartments, or between the two, so as to make a calmer region above said middle level between the latter and the free surface, as will be seen below.

The flow rate D is, itself, and for example, in advantageous embodiments, greater than four times, five times or even eight times the flow rate d.

With such a method, use is thus made of organized vertical flows at the expense of horizontal flows, which are practically banished, so that encounters between the interacting elements are maximized. The water to be purified is itself used as a reactant by virtue of the pumping in the final compartment, located downstream, and reinjections into the upstream compartments, of the purified product itself that bears an oxidizing function.

In advantageous embodiments, use is additionally made of one and/or the other of the following arrangements:

the chemical oxidant is, alone or in combination, chosen from the oxidants $H_2O_2$, $O_3$, $O°$ or $OH°$;

the chemical oxidant is injected into a circuit in bypass with one of the compartments;

the method comprises the use of circulation in four compartments;

the supernatant phase is continuously discharged via scraping in the upper part of floating sludge into an overflow compartment.

Such a gravity system has the advantage of limiting the risks of clogging;

the chemical oxidation is mainly carried out in the last compartment for circulation of the effluents of the chamber;

the chemical oxidation comprises a bubbling of microbubbles obtained by electrolysis known as nano-bubbling;

the size of the bubbles of the nano-bubbling at the moment of their creation is between 0.01 mm and 0.1 mm, for example of the order of 0.05 mm;

the nano-bubbling flow rate is between 2 d and 15 d;

the nano-bubbling is obtained by circulating a portion of the recycled effluents to parallel flat electrodes, advantageously electrodes that produce radical substances at the surface of said electrodes and more particularly electrodes doped with diamond;

the flow rate D for circulating the effluents through the compartments is greater than 10 times the flow rate d;

the vertical bubbling is carried out with air, the average size of the bubbles when they are emitted being between 0.5 mm and 5 mm;

the vertical bubbling is obtained by cavitation in the effluent circulation circuit;

the flow D is reinjected in the lower part of one or more of the compartments in a determined and adjustable manner;

the vertical hydraulic regime in the chamber is selected so that the lower part is in a highly turbulent regime ($Re \gg 3000$ $m^2 \cdot s^{-1}$) and the upper part near the free surface is in laminar regime ($Re < 2000$ $m^2 \cdot s^{-1}$);

a complementary agitation is carried out at high flow rate in one or more of the compartments by recirculation via a bypass circuit attached to the compartment in question.

The expression "high flow rate" should be understood to mean a flow rate greater than 3 d, for example 4 to 10 times higher;

a complementary oxidation is furthermore carried out in the bypass circuit.

In this case, advantageously the oxidation system used is an electrolysis system which produces radical oxidizing substances at the surface of the electrodes. Surprisingly, the effectiveness of the operation is further improved when the recirculation flow rate is at least three times greater than the theoretical flow rate crossing the electrolysis system;

the method furthermore includes a biological filtration. Due to the breaking or cutting of the length of the molecules obtained with the preceding steps of the method, the $BOD_5$/COD ratio has become very favorable and such a supplementary biological treatment permits an even more exceptional result.

The invention also proposes a device that uses the method as described above.

It therefore proposes a purifying device for liquid effluents charged with dissolved or undissolved organic and/or mineral substances, in order to bring them below a given COD threshold, comprising a vertical chamber that has at least two adjacent vertical compartments that communicate with one another, means for supplying air for vertical bubbling in the lower part of the compartments, means for introducing effluents on one side and means for withdrawing them from another side in the upper part of the chamber at a flow rate d, and means for supplying said effluents with fluid for hydraulic or gaseous chemical oxidation, characterized in that the chamber has at least three compartments that communicate with one another via one or more openings made in a wall on the one hand at their lower part or on the other hand at a middle level, in order to allow a circulation between compartments successively from the top to the bottom and from the bottom to the top and so on, means for circulating the effluents, via an external hydraulic circuit between the openings in the lower part of the walls and those at a middle level at an overall flow rate D at least three times greater than the flow rate d, means for continuously discharging the supernatant phase, and control means that make it possible to adjust the rate of chemical oxidation and also the flow rate and size of the bubbles of the vertical bubbling in order to obtain a separation of solid/liquid and/or liquid/liquid phases of the effluents at the surface of the chamber that makes it possible to obtain a COD below the given threshold.

Advantageously, the chamber comprises five compartments, including four for circulation of the effluents and one for discharging the floating sludge via gravity.

Also advantageously, the compartments have a working height H between 2 m and 6 m, for example of the order of 4 m.

In one advantageous embodiment, the ratio of the working height H to the section S of each compartment is between 4 and 10.

In another advantageous embodiment, the chemical oxidation is carried out by producing hydroxyl free radicals OH° from the water molecule $H_2O$, this production possibly being carried out by electrolysis.

Advantageously, the air bubbles for vertical bubbling are produced in the external hydraulic circuit for circulating effluents via cavitation means.

Also advantageously, at least one compartment comprises a bypass circuit which is attached to it for high flow rate recirculation, in which a complementary oxidation is or is not carried out, this oxidation advantageously being carried out by electrolysis.

In another advantageous embodiment, the device furthermore comprises means for treatment via biological filtration.

The invention will be better understood on reading the following description of embodiments given below by way of non-limiting examples. The description refers to the drawings which accompany it, in which:

FIG. 2 is an expanded diagram showing the internal and external flows of the device of FIG. 1.

FIG. 3 is a schematic top view of the chamber from FIG. 1 showing the directions of circulation of the streams.

FIG. 5 schematically gives, in exploded perspective, an embodiment of the device for oxidation via electrolysis.

Figure 6:
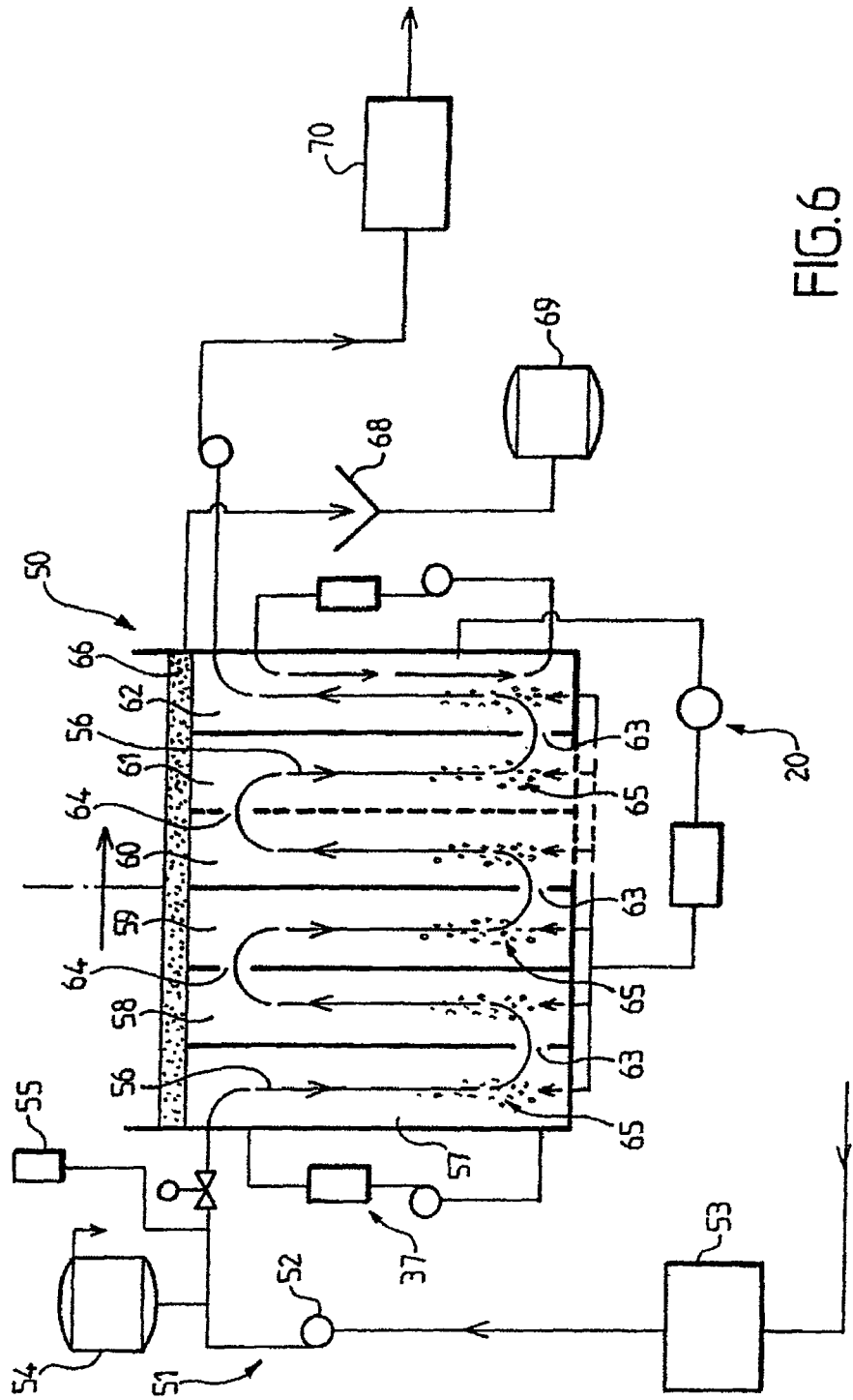

FIG. 6 is an operating diagram of a device according to another embodiment of the invention having several adjacent compartments.

FIGS. 7 to 10 represent purification curves showing the COD obtained, as a function of the treatment time, in various examples, with the method according to the invention.

Figure 11:
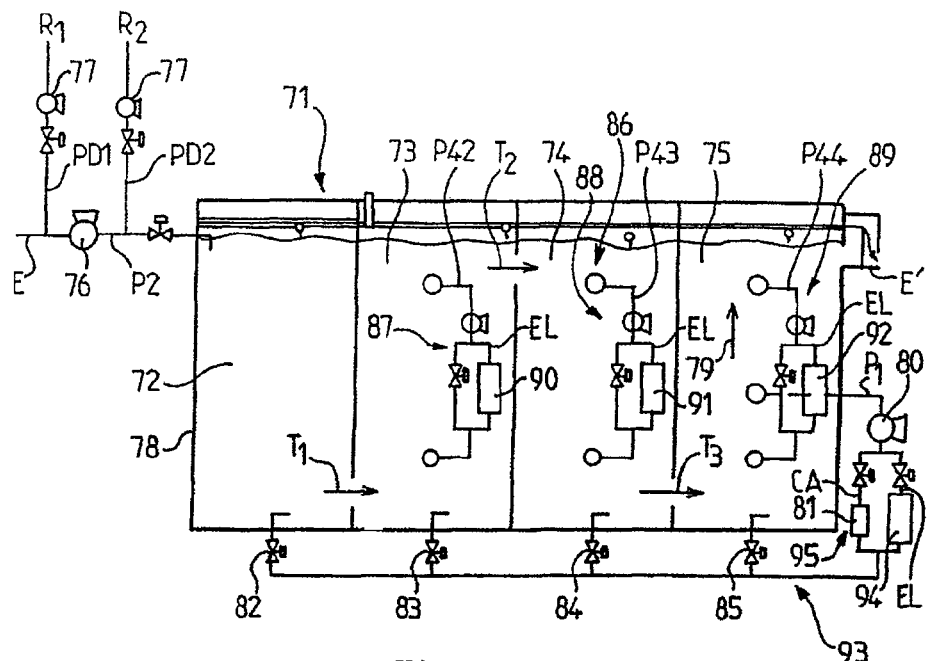

FIG. 11 is an expanded operating diagram of a device according to another embodiment of the invention.

FIGS. 12 to 15 are diagrams of results obtained with the device from FIG. 11, with the same type of effluent but with a variable composition and as a function of various initial COD values.

Figure 1:
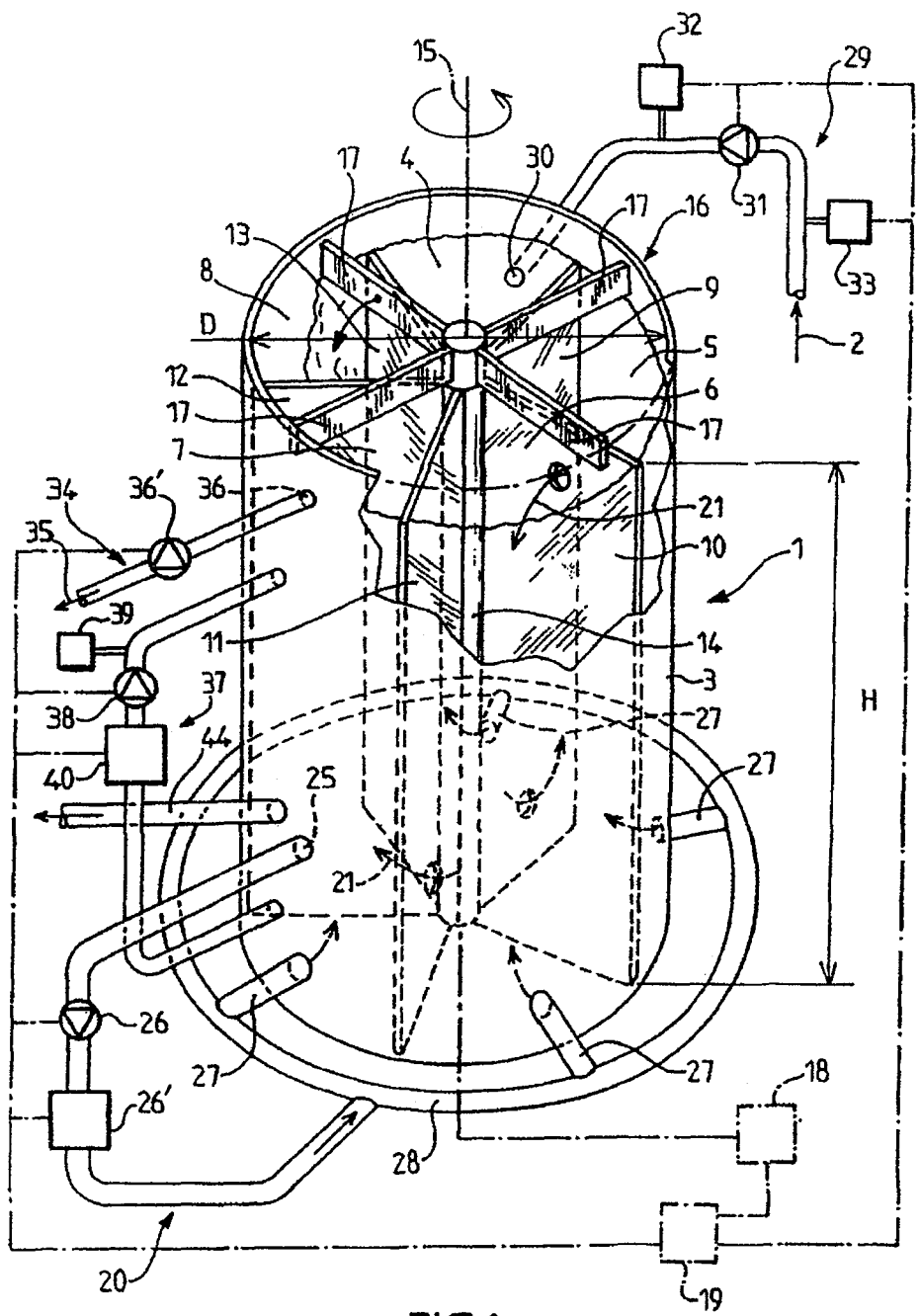
FIG. 1 is a schematic perspective view of one embodiment of the device according to the invention.
Figure 4:
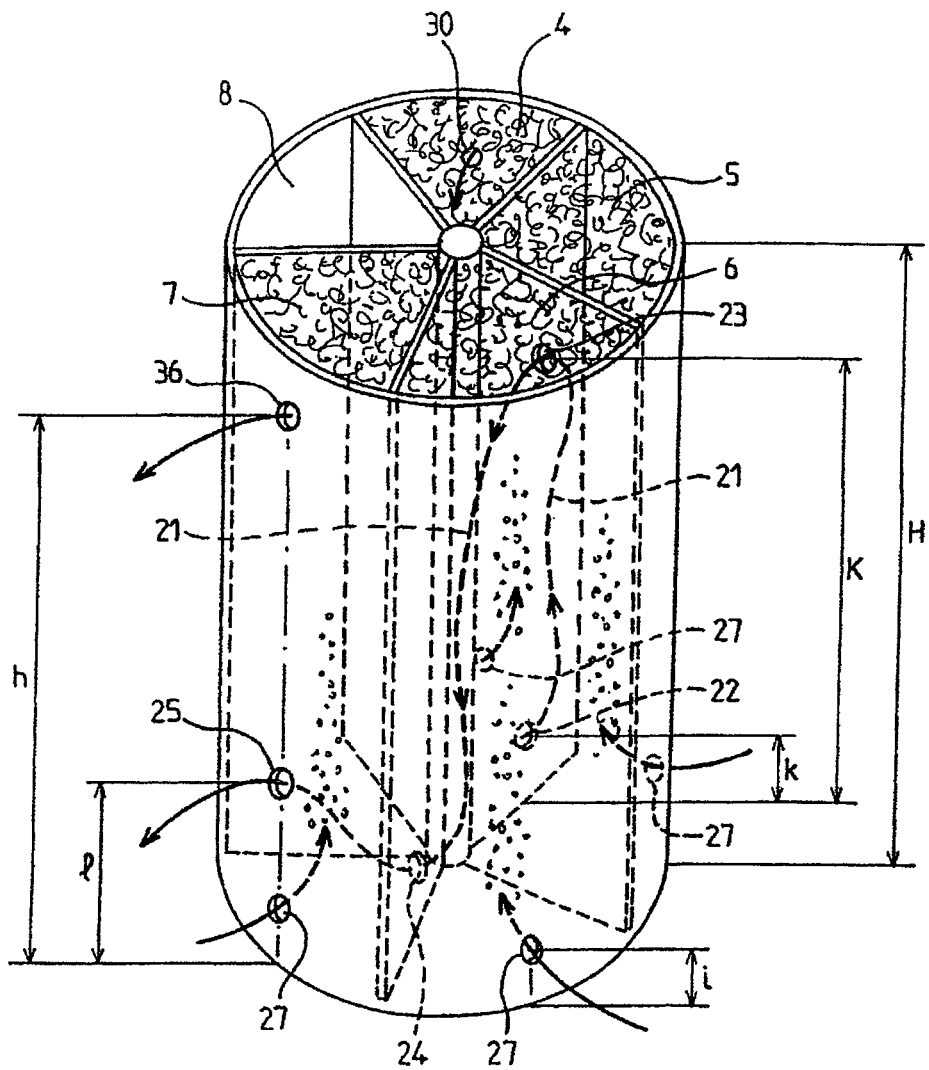
FIG. 4 is a perspective view of the chamber from FIG. 1 here again illustrating the flows.

FIGS. 1, 2 and 4 show a device 1 for purifying liquid effluents 2 at a flow rate d, for example of 2 m³/h comprising a vertical cylindrical chamber 3 made of stainless steel, having a working height H, for example of 5 m and a diameter D, for example of 2 m.

The chamber comprises five vertical compartments, including four for circulation of substantially identical effluents 4, 5, 6 and 7 on the one hand, and one compartment for discharging sludge 8 on the other hand, the sections of which form substantially triangular disk portions with equal surface areas S. Other sections, for example circular sections, sufficiently widened to avoid any obstruction due to the bubbling, enable a similar efficiency.

The compartments are respectively separated from one another by internal walls 9, 10, 11, 12 and 13 positioned radially and regularly around a cylindrical central core 14 having an axis 15 equipped in the upper part, above (1 to 2 mm) the upper edge of the internal walls, with a scraper system 16 having four identical blades 17 in the form of rectangular flat plates positioned radially and distributed angularly. The system 16 is actuated by a rotor motor 18 controlled in a manner known per se by a programmable controller 19 for controlling the whole of the device.

The device 1 furthermore comprises a system 20 for external hydraulic circulation between compartments 4, 5, 6 and 7 (cf. also FIGS. 2, 4 and 11) of liquid effluents having an overall flow D=x×d, for example with x=10, in order to allow, after distribution of this total flow between the various compartments, a circulation 21 between said compartments successively from the bottom to the top and from the top to bottom and so on by virtue of openings of sufficient diameter to allow the passage of the partial flows, and/or more generally of the flow D, in the case where the entire flow D would be sent back into the first compartment alone.

The openings are made in the walls, namely, in the example more particularly described here, an opening 22 in the lower part of the wall 9, at a distance k from the bottom, for example at 30 cm, an opening 23 made in the upper part of the wall 10 at a distance K from the bottom, for example at 4 m 50 cm and an opening 24 made in the lower part of the wall 11, at said distance k from the bottom. The flow D is then taken in by an intermediate opening 25 located at the distance l from the bottom, for example at 1 m 50 cm, in the compartment 7 via the pump 26 for circulation at high flow rate D, in order to be injected into the lower part, below the lowest openings 22 and 24, for example at a distance i from the bottom of 10 cm, by four identical connections 27, made in each compartment 4, 5, 6 and 7, said connections being connected to one another via a distribution duct 28. Control means, for example solenoid valves controlled by the controller 19, not represented here but known in themselves are provided in order to control the flow rates and/or balance the pressure losses between the various compartments.

The circulation system 20 furthermore comprises a cavitation device 26' that makes it possible to inject small-diameter air bubbles (having a diameter of less than 1 millimeter) into the flow, which therefore constitutes the supply of vertical bubbling air mentioned above.

This bubbling air has no driving role, and even acts instead as a brake when it is counter-current, for example in compartments 4 and 6.

The device 1 also comprises means 29 for introducing effluents 2 in the upper part of the first compartment 4 at the flow rate d via a connection 30 located at a height h slightly less than H, for example located at H—20 cm substantially on the generatrix of the middle of the outer wall.

The means 29 comprise a pump 31 controlled by the controller 19, and circuits 32 and 33 for adding reactants known in themselves, for example in liquid form, and that are dependent on the type of effluents treated in order to better enable the oxidation and/or the breakage of the long molecules.

It comprises, on the other side, means 34 for extracting the effluents treated 35 at the flow rate d at the height h in the upper part of the last compartment 7 via a connection 36, comprising a pump 36'. The device 1 more particularly described here also comprises a circuit 37 for supplying the effluents in the last compartment with hydraulic or gaseous chemical oxidation fluid.

This circuit comprises a pump 38 for circulating a reactant from the bottom to the top in the compartment 7. It comprises a reactant supply system 39 and/or in-line means 40 for oxidation via chemical electrolysis.

These means 40 (cf. FIG. 5) are for example formed by a series of several parallel flat electrodes 41.

The OH° ions 42 are produced at the surface of the electrodes over a thickness of a few tens of μ, a turbulent flow 43 being formed over a sufficient surface area, the electrodes being spaced a few millimeters apart.

The device 1 finally comprises the compartment 8 for gravity discharge of the sludge, comprising a collection hopper with a guide funnel (not represented). The sludge is then recovered from the bottom in 44, for example by pumping (not represented), the circulation of the effluents taking place in the direction 45 (cf. FIG. 3) and that of the sludge scraping in the upper part in the reverse direction 46.

The description will now be rounded out below by specifying the operation of the method, according to the embodiment more particularly described here, by referring to FIGS. 1 to 5, and especially to FIGS. 2 to 4 where the circulations are more precisely represented.

The waters 2 to be treated by the method are waters containing a pollutant load composed of dissolved or undissolved organic and/or mineral substances.

They are recovered upstream, optionally after a first treatment of the type known in itself (screening, desilting, deoiling, etc.), then transferred to the device in order to be introduced thereto with a flow rate d, for example between 1 m$^3$/h and 15 m$^3$/h.

Reactants are furthermore introduced directly or indirectly into the four compartments 4, 5, 6 and 7, in liquid or gaseous form via 32, 33 and 37.

During their circulation through the compartments 4, 5, 6 and 7, the waters will benefit from several simultaneous actions targeting the separation between the polluting elements and the water itself, and the treatment of these by oxidation.

It will thus be possible to limit the pollutant load of the water exiting at 36, in order to comply with standards for release to a treatment plant (the method then taking place as a pretreatment) or release to the natural environment (the method then taking place as a complete treatment).

Likewise, it makes it possible to reduce the sludge produced and to prepare the product for its final treatment, by virtue of a reduction of the size of the molecules, stemming from their oxidation/cutting at the C—C bonds and a destabilization of the molecular clusters.

In the embodiment more particularly described each compartment 4, 5, 6 and 7 has a role.

This role aims first to extract the maximum amount of polluting matter, by using, if necessary, the techniques for coagulation and flocculation of this matter. The method according to the invention thus permits a sequenced contribution, compartment after compartment, by inducing several actions of physical and chemical order which will be able to be optimized as a function of the effluents.

Thus with certain effluents it will, after a few tests, be noticed that it is necessary to seek a strong chemical oxidation effect from the beginning, then, the product already being pretreated, to attack it in another manner by modifying it by reinjection of the pretreated effluent into the following compartments, the content of which is different, each compartment in effect containing a different effluent, the separation between compartments giving a non-homogeneous product inside the reactor.

The chemical oxidation is firstly obtained by oxygen from the air itself, but also (see above) by introducing molecular or radical chemical oxidants.

It should be noted here that the procedures for these oxidations are substantially different.

The oxygen from the air which remember is not there to have a driving effect, is, itself, introduced by bubbling by virtue of the cavitation prepared in 29.

The device, due to its configuration, allows a long contact time between the bubbles and the water.

The size of the bubbles is moreover significantly small (that is to say in the embodiment more particularly described, less than 1 mm in diameter) so as to ensure a large contact area. Furthermore, since the formation (production) of bubbles is carried out in a hydraulic circuit at high flow and high speed, it enables an effective mixing between the air and the water.

The radical or molecular oxidant is, itself, introduced into the hydraulic circuit 37 at high speed.

A very powerful oxidant is used here of the type $H_2O_2$ or $O_3$ or a combination of the two, or else of O° or OH° radicals.

When the oxidants are produced by electrolysis, the treated water being the electrolyte, there is the benefit therefore of a high dispersion in contact with the anodes and cathodes.

The procedure for introducing the molecular oxidants itself enables, as a function of the effluents treated and in a manner that can be easily optimized by a person skilled in the art, a contact time that is as long as possible. Oxidizing gas or liquid thus benefit from mixing with the treated water by the same principle as the oxygen from the air.

A separation of the polluting phases and water is further obtained by the use of the surfactant nature of the air bubbles.

As the air bubbles pass (rising wavy arrows from FIG. 2), the clusters of molecules are thus captured and rise to the surface of the compartments where the extraction is carried out in a calm zone.

At the surface of the compartments, at atmospheric pressure, the bubbles burst, the free surface of the water acting as a captor for the hydrophobic heads of the structures to be extracted.

The system of regular scraping, carried out with the blades 17, itself makes it possible to clear the surface in order to maintain the active nature thereof. The scraping is carried out very slowly, at a rate of a few revolutions per minute.

The scraped products are themselves in the form of pasty foams, and are recovered in the compartment 8 which is in the form of a discharge spout.

It should be noted that the hydrophobic poles are sometimes physically protected by the hydrophilic poles of the molecular clusters. These arrangements, which ensure a high solubilization of these chemical structures, then make their treatment and their extraction from water, and consequently the pollution control thereof, difficult.

The cohesion of these molecular clusters is in effect provided by very significant forces of coulomb and van der Waals type.

The device according to the invention makes it possible to intervene in these bonds:
  via the introduction and the optimization of the action of a highly charged chemical structure carrying out a work of destabilization of these structures (bubbling, hydraulic or gaseous oxidizing chemical reactant);
  via the production of impacts that generate a high energy in the molecular clusters. These high energies are produced by the conversion of the kinetic energy into impacts on the walls or on the clusters themselves due to the strong agitation due to the recirculation at high flow rate $D \geqq 3$ to 5 d.

As all of these actions are produced within a device having several compartments which have a sufficient water column, exceptional results are then surprisingly obtained, of the type of those which will be explained in detail below with reference to tables I to V and VII to IX and to FIGS. 7 to 11 and 13 to 15.

It will be noted here that the existence of a physical distance between the upper and lower parts of the compartments allows the hydraulic regimes of these two zones to be different.

The upper part of the two compartments indeed has a two-dimensional laminar flow whereas the lower part is, on the other hand, a zone of high hydraulic turbulence, with three-dimensional flow and Brownian motions.

More specifically, the lower part of the compartments is the return zone of the hydraulic circuits, and the zone of direct provisions of air bubbles and oxidants, at high flow and high speed, knowing that the compartments 4, 5, 6 and 7 communicate, on the other hand, with one another at middle levels, and in the lower part, via a group of baffled flows. The upper zones thus benefit from the calm necessary for the physical and chemical contributions that allow good purification.

The flow regime of the device is also specified below with reference to FIG. 4. The first compartment 4 (which benefits from the introduction of the raw waters) via the top, sees the latter flow to the bottom (above the reentry zone) of the strongest hydraulic circuit. The second compartment 5 flows to the third via the top at a level below the upper level of the water.

The previous compartment 6 is that which precedes the outlet of the complete line which takes place in compartment 7. Once again, this baffled flow guarantees a long contact time and a greater extraction efficiency via the bubbles, due to the production of (upward/downward) countercurrents.

From the first compartment 4 to the last 7, it is then observed, in a spectacular manner, that a negative pollution gradient of the water is established.

In the embodiment of the invention more particularly described here, the chemical oxidation circuit is only implemented in the last compartment 7.

The process according to the invention thus enables either the complete treatment of the water, or a work for preparing the water before it is taken up by a complementary system, for example a biological system.

By virtue of the upward circulations of the bubbles and oxidants, whereas the liquid flows are, themselves, in turn upward or downward, but vertical, the stream indeed passes through the device while enabling it to organize exclusively vertical flows.

According to one of the distinctive features of the process, the effluent is, as has been seen, itself used for carrying out the desired physical and chemical work.

It is thus the kinetic energy generated over a volume of the latter that enables the production of bubbles, but it is also this energy that makes it possible to break the emulsions of the product itself.

Finally, it is the ability of the product to itself conduct electricity that makes it possible to introduce oxidizing reactants produced in the water molecule contained in the effluent as is the case in an oxidation by electrolysis.

A great saving in terms of matter and energy is thus made, which is one of the great advantages of the present invention.

Another embodiment of a device according to the invention will now be described with reference to FIG. 6.

Subsequently, the same reference numbers will be used to denote the same components or components similar to those described in the preceding figures.

FIG. 6 shows a device 50 comprising means 51 for supplying effluents by means of a pump 52 after pretreatment 53. The means 51 comprise various reactant feed devices 54, 55.

The effluents themselves follow a path 56 between the adjacent compartments 57, 58, 59, 60, 61, 62 (non-limiting number) connected to one another by openings alternately positioned at the bottom 63 and at the top 64, in order to form a baffle.

In the first and last compartments 57 and 62, two oxidation circuits 37 of identical type are, furthermore, provided.

The circulation of effluents at high flow rate is taken up by the circuit 20, and reinjected into the lower part of each compartment, in an identical manner, after treatment by cavitation, which will enable the bubbling 65. The sludge 66 is recovered at the surface of the liquid 67 in order to be discharged to an overflow 68 and stored or treated in 69.

The purified effluents are, themselves, recovered in the upper part of the last compartment 62, in order to be stored or treated via means at 70.

Various examples of treatment of effluents according to the invention will now be given in order to illustrate the exceptional results obtained with the process according to the invention.

A first example is given, with reference to an effluent predominantly composed of starch. Starch is a polysaccharide having a molecular weight between 100 000 amu and more than 1 000 000 amu.

The polysaccharide is made of sugar, furthermore composed of a straight chain of glucose molecules joined together by an oxygen molecule between the first carbon of a first molecule, and the fourth carbon of a second molecule and so on, the glucose-glucose linkage being of a type that is particularly difficult to break.

By virtue of the process according to the invention, and a device as described above, a content of SM (suspended matter) of less than 10 mg/l and a COD<120 mg/l will be able to be obtained. Similarly, a COD/$BOD_5$ ratio favorable to the biodegradation of the effluent will be able to be observed. The $BOD_5$ is the biological oxygen demand over five days.

In order to do this, and according to the embodiment of the invention more particularly described below, a physicochemical treatment is first carried out with catalysis, flotation, microbubbling in the four water compartments of the device, which makes it possible to reduce the COD by 80% to 90% leading, for example, to a COD between 500 and 1000 mg/l being obtained.

A hyperoxidation is additionally and simultaneously carried out in the last compartment, which is partially repeated in the other compartments, due to the entrainment of the products by the high flow rate circulation circuit going round in circles.

This phase proves, alone, capable of destroying the complex molecules. It makes it possible to reduce the COD and to lower it below 120 mg/l of COD.

It furthermore increases the $BOD_5$/COD ratio and thus reveals a high biodegradability of the substrate for a cutting of the molecular chains that makes it possible to obtain in fine the smallest organic structure possible, that is to say $CO_2$.

According to one particular embodiment of the invention, the hyperoxidation is carried out starting from OH° ions, obtained by catalysis.

The latter are for example produced, at the surface of flat electrodes that are stacked in parallel, inserted in a module, over a thickness of a few tens of mm, for example electrodes manufactured by the German company CONDIAS. A mass transfer is caused in contact with the electrodes and the presence of the most turbulent flow possible through these electrodes causes an entrainment of microbubbles.

As has been seen, a schematic embodiment of the module is represented, by way of non-limiting example, with reference to FIG. 5. The electrodes are positioned in parallel, in a stack. Their width, for example of the order of 5 cm, allows a good dispersion of the fluid at the active surface of the electrodes and prevents laminar flows, which minimizes the dispersion effect in contact with the surface of the electrodes.

The module is formed from a small chamber having for example an oval surface area, the passage flow rate through the electrodes being, for example, 20 m$^3$/h in order to render the fluid effective and to charge it sufficiently with OH° oxidant.

Due to this electrolysis, the fluid becomes hyperoxidizing. It is then observed that the chemical reactions become fleeting and violent, the hydroxyl radical extracting a proton and an electron (H$^+$) from the first organic structure that it encounters, in order to reform a stable water molecule.

It is then understood that this phenomenon is accompanied by a cutting of the carbon-based structure producing a radical structure in search of a hydrogen to remove. There is thus a chain of oxidization reactions of the organic matter, which may be exploited.

The hydrolysis also produces a very high concentration of microbubbles which will prove to function as surface-active structures of the organic molecule.

During the passage of a microbubble, it is then observed that the molecule latches on via its hydrophobic pole and rises to the surface. The denser the bubbling, the more it is observed that the extraction is good and the skimming procedure is efficient.

Represented in reference to FIGS. 7 to 11 are the results of tests carried out on "white waters". This is an effluent of milky appearance, with a pH close to neutrality (pH=6.8), produced by centrifugation, then a flotation that has permitted deoiling. It is then at a temperature of around 60° C.

More specifically, the products treated are organic matter resulting from the treatment of oilseeds after subtraction of lipid materials.

These residues result from the refining of the seeds then a centrifugation phase used to subtract the oily remainder.

The effluent to be treated is thus composed:
  of proteins, 2 to 3% solids;
  of oily residues that are not recovered by centrifugation, including waxes (fatty acids with 30 carbons), 20 to 30% solids;
  and of glucides (predominantly starches), the remainder of the solids.

In other words, the effluent is predominantly composed of long-chain carbon-based structures or of assemblies of these molecular structures.

It is in emulsified form with a reference COD lying between 15 000 and 30 000 mg/l.

Combined with this high COD, it is possible, moreover, to observe a COD/BOD$_5$ ratio that is favorable to the biodegradation of the effluent but a particularly unfavorable COD/BOD$_{21}$ ratio explaining the difficulties encountered by the customary solutions.

The organic equilibrium of the constituent material of the effluent generates a looped biological consumption that produces and reproduces an organic material without truly purifying it.

Example: there thus has been observed, in the plant operating procedures, the formation of dextrin molecules and especially cyclodextrin molecules (dextrin molecules organized in two rings of conical shape). These structures are bioresistant, highly soluble and diffuse. In convention treatment, the phenomenon of plasticization of the organic material is only amplified, the purpose being however to curb it.

These phenomena give the product a heel of non-biodegradability with a COD that appears inextricable, which lies in the vicinity of 1000 mg/l (±300 mg).

With the device according to the invention having four water compartments, exceptional results corresponding to tables I to V (series 1 to 5) have been able to be observed.

The industrial treatment of the effluents was carried out at a flow rate between 1 and 2 m$^3$/h, a total chamber volume of 5.5 m$^3$, and a recirculation (known as loop) flow rate of 60 m$^3$/h.

The oxidation system is an electrolysis system of the type described above which is carried out on the loop itself.

The operation of the device is completed by a 100-liter fixed bed biological action.

Figure 7:
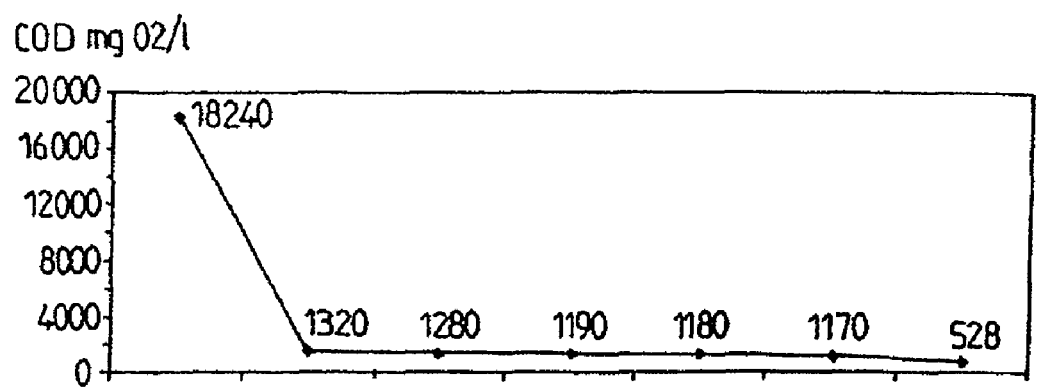

With reference to FIG. 7, the table I below was obtained:

TABLE I

| Sample | Number | COD mg/l | Abatement |
|---|---|---|---|
| Raw effluent | 1 | 18240 | |
| Treatment in batch of 5.5 m$^3$: 1 h/flotation and oxidation | 2 | 1320 | 0.928 |
| Treatment in batch of 5.5 m$^3$: 2 h/flotation and oxidation | 3 | 1280 | 0.930 |
| Treatment in batch of 5.5 m$^3$: 3 h/flotation and oxidation | 4 | 1190 | 0.935 |
| Treatment in batch of 5.5 m$^3$: 4 h/flotation and oxidation | 5 | 1180 | 0.935 |
| Treatment in batch of 5.5 m$^3$: 5 h/flotation and oxidation | 6 | 1170 | 0.936 |
| +Biology 10 h | 7 | 528 | 0.971 |

It is seen that, for a treatment of 5 hours in batch mode, the results reveal an abatement of:
  16 920 mg/l of COD the first hour, which represents a yield of 93% abatement;
  150 mg/l of COD during the following 4 hours.

The physicochemical treatment therefore bottoms out at around 1100 mg/l.

The biological phase makes it possible, on the other hand, to resume the abatement of COD.

In a very short time period (with regard to the low volume of the biological filter), the abatement of COD is 654 mg/l (55%), i.e. 645 g of COD for the whole of the biological batch. This is better performing than the maximum theoretical ratio (415 g for 10 h).

Figure 8:
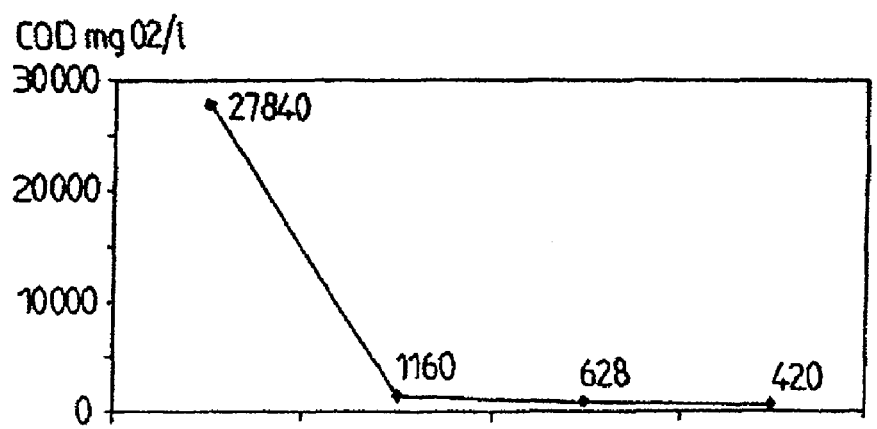

A second example was carried out with reference to FIG. 8 and made it possible to obtain the table II below:

TABLE II

| Sample | Number | COD mg/l | Abatement |
|---|---|---|---|
| Raw effluent | 1 | 27 840 | |
| Continuous treatment at 1 m$^3$/h for 1 h | 2 | 1160 | 0.958 |
| Biology in 10 h | 3 | 628 | 0.977 |
| Biology in 10 h + oxidation pass | 4 | 420 | 0.985 |

This time, with the same installation, operating continuously at 1 m$^3$/h and by improving the procedure conventionally regarding the method of introduction and method of mixing the reactants (a specific coagulant metered at 60 mg/l and a specific flocculant metered at 40 mg/l), a COD abatement (96%) was obtained that was even better, changing from 27 840 to 1160 mg/l.

Regardless of the initial COD, the physicochemical phase here bottoms out in the vicinity of 1100 mg/l.

Despite the continuous mode (at 1 m³/h for 5.5 m³ of chamber volume), the COD abatement is as effective as in batch mode.

After 10 hours of biological filtering, the abatement was 45%, i.e. 532 mg/l or 532 g of COD for the biological batch, i.e. still better performing than the theoretical optimum (415 g for 10 h).

This phenomenon, which occurred whilst the material-consuming biofilm was barely formed, is the consequence of the oxidation carried out during the physicochemical phase.

Moreover, if a sample of the effluent is withdrawn from the biological phase that has undergone passage through the oxidizing electrodes, a certain abatement of 740 mg/l (i.e. 64%) is obtained relative to the product before entry into the biological phase.

The oxidation made it possible to obtain an abatement of 208 mg/l of COD, i.e. 208 g of COD.

Figure 9:
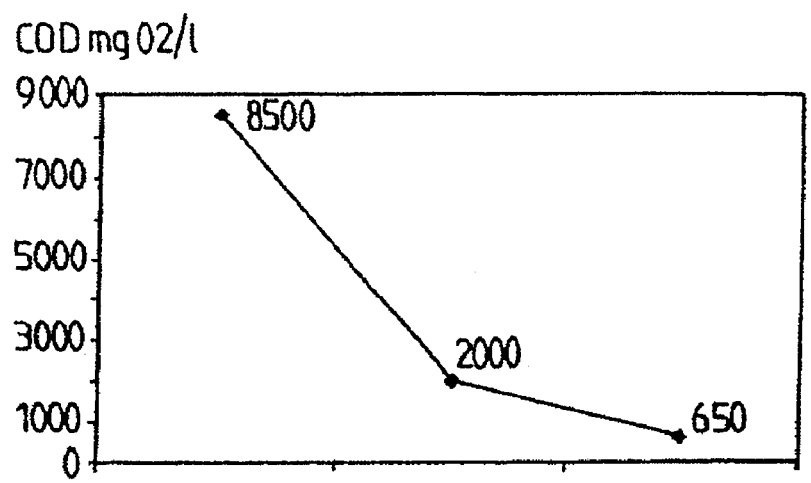
Figure 10:
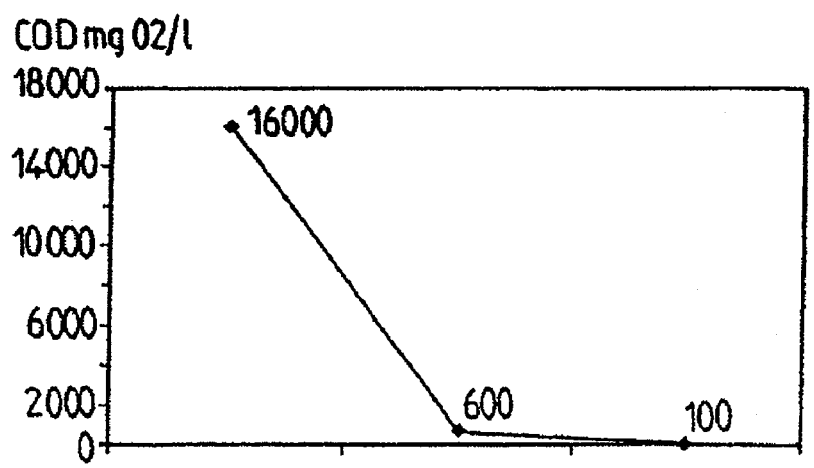

FIGS. 9 and 10 themselves refer to tables IV and V below.

TABLE IV

| Sample | Number | COD mg/l | Abatement |
|---|---|---|---|
| Raw effluent - workshop oil emulsion | 1 | 8500 | |
| Physicochemical treatment ½ hour without oxidation | 2 | 2000 | 0.933 |
| Physicochemical treatment + ½ hour with oxidation | 3 | 650 | 0.978 |

This here is the treatment of an emulsion of organic and mineral oils, a very stable emulsion, stabilized by the provision of exogenous surfactants.

The data are the following:
Device: 1.3 m³
Operating flow rate: 1 m³/h
Residence time: 1 hour 20 minutes
Bubble production recirculation pumping of 40 m³/h.
Oxidation on the recirculation of 40 m³/h by electrolysis for production of hydroxyl free radicals.
Effluent: emulsion of 8500 mg $O_2$/l of COD, SM: 150 mg/l, total hydrocarbons: 5 mg/l
Water after Treatment:
SM: 35 mg/l
COD: 600 mg/l
Total hydrocarbons: <0.05 mg/l.

TABLE V

| Sample | Number | COD mg/l | Abatement |
|---|---|---|---|
| Raw effluent - hydrocarbon-based water | 1 | 16 000 | |
| Physicochemical treatment 1 h 20 min | 2 | 600 | 0.943 |
| 9 m³ biological fixed bed | 3 | 100 | 0.990 |

Here, the water treated is water loaded with hydrocarbons.
The parameters used are themselves the following:
Device: 5.5 m³
Operating flow rate: 4 m³/h
Residence time: 1 hour 20 minutes
Bubble production recirculation pumping: 50 m³/h
Oxidation on the recirculation of 50 m³/h by electrolysis for producing hydroxyl free radicals) (OH°), $H_2O_2$ and $O_3$.

Effluent:
COD: 16 000 mg $O_2$/l
Water after Treatment:
COD: 600 mg $O_2$/l
Water after additional treatment with a biological fixed bed having a volume of 9 m³ with an operating flow rate of 0.5 m³/h.
COD: 100 mg/l Another embodiment of a device 71 having four compartments 72, 73, 74, 75 and also its operation according to the invention will now be described with reference to FIG. 11.

The device 71 comprises a pump 76 which sucks up the effluent.

The admission of reactants R1 and R2 is provided here in the required proportions (metering pump 77) at the flow rates PD1 and PD2 via introduction before and after the body of the pump 76.

The introduction is then carried out in the reactor 78 of the device via the compartment 72 in the upper part with an introduction in the direction of the bottom of the reactor in order to avoid an effect of reflections on the edges of the compartment.

The passage between the compartments 72 and 73 is carried out via the transfer T1 located in the lower part of the tank.

During its descent into the compartment 72, the effluent encounters an upward stream 79 of the treated fluid sucked up at a flow rate P1 (for example 100 m³/h) in the last compartment 75 by the pump 80.

This mixing is improved by the creation of a vortex in a manner known per se, that optimizes the contact time. This mixing has a physical advantage since the upward stream has benefited from the production of small bubbles created by cavitation for example based on the speed of the fluid through a venturi system 81.

This mixing has a chemical oxidation role since the water from the fourth compartment has a very high oxidation level for example of 300 to 900 mV.

The solid/liquid and colloid/liquid phase oxidation and separation actions are then perpetuated in the second compartment, then in the third and the fourth compartments.

The user controls the compartment outlet valves 82, 83, and 85 in order to produce a vortex effect and turbulence effect necessary for the good operation of the process, to distribute the pressure losses and to control the respective flow rates as a function of parameters optimized by a person skilled in the art.

In order to have a sufficient contact time, the person skilled in the art proceeds indeed by virtue of successive approximation tests by acting on the control points of his plant within the scope of the chemical engineering operator and/or technician of the art, and taking into account the inlet/outlet specifications of the effluents to be treated.

This control must, in addition, enable the upper part of the tank to remain very calm, without disorder except that caused by the rise of the material carried by the upward-moving bubbles that catch the hydrophobic heads of the water.

In the advantageous embodiment described with reference to FIG. 11, which is particularly effective, supplementary bypass external hydraulic circuits (oxidation loops) 87, 88 and 89 are further provided. These allow a strong supplementary agitation in each of the compartments 73, 74 and 75 at high flow rates P42, P43, P44 for example of 40 m³/h with electrolysis reactors and/or supplementary oxidation device (reactors 90, 91, 92).

In other words, while the theoretical flow rate for passing through the electrolysis reactors is for example 10 m$^3$/h, a recirculation is organized at a flow rate more than 3 times higher than the theoretical flow rate of the reactor. The operator then plays with the closure of the solenoid valve located on a duct parallel to that of the reactor in order to increase said flow rate.

This system also makes it possible to be as turbulent as possible when passing through the reactor and therefore in contact with the electrodes in order to maximize the probability of encountering oxidants. It also makes it possible to recirculate the entire volume to be treated a greater number of times, which further increases the probability of oxidation of the material.

On arrival at the surface, the bubbles burst and it is the surface which then acts as an organic matter catchment system.

According to the invention, it is necessary here that this surface is effectively cleared of its material by scraping or suction of the supernatant phase.

This dense but creamy matter is almost the only residue of the treatment, which is a significant advantage of the invention.

The rate of scraping or the suction flow rate of the creams must be carried out in order to take away the material effectively but without disturbing the static nature of the film of water.

The effluent benefits from a strong suction T2 from the second compartment 73, this suction being carried out under an area 86 for amassing matter and bubbles of the upper part of the compartment.

Once again, it must avoid disturbing the calm of the top zone of the compartment located above.

Back in the following compartment 74, the water was then able to benefit from a very high oxidation, this oxidation produced bubbles.

This water is then introduced again into the lower part T3 of the compartment 75 in order to make it benefit again from the bubbling favorable to the phase separation. It is in this compartment that the dissolved polluting phase is then particularly precipitated by the oxidation and especially by electrolysis if electrolysis is the technique used to produce the oxidants.

Once precipitated, this material is here again captured by the bubbles as they travel to the top of the compartment and is subtracted from the medium.

During its passage toward the compartment 75, the water was thus able to benefit from a very strong oxidation that reduces its content of polluting material, cold-cracking the molecules.

It is thus observed that molecules that were not treated up to then are reduced to $CO_2$ molecules or to smaller molecules which subsequently will finally and more readily be able to be consumed by bacteria.

This is the reason why such a process is not only effective and can be used alone, but also as a pretreatment before a more conventional biological treatment plant.

The water thus gradually loses its organic polluting load, its color and its odor.

The effluents are then sucked up by the pump 80 in order to be injected into the oxidation loop 93 comprising a device 94 for electrolysis (reactor) and a device 95 for cavitation (air flow rate CA), which are in parallel.

Represented below is a table of the parameters used by a person skilled in the art for controlling the device described above in order to obtain excellent results of the type of those which will then be presented with reference to FIGS. 12 to 15.

TABLE VI

| Functions | | Parameters |
|---|---|---|
| Hydrodynamic | 1 | Treatment flow rate P2, m$^3$/h |
| | | Recirculation flow rates P1, P42, P43, P44: m$^3$/h |
| | | Vortex, opening of the tank outlet valves 82, 83, 84, 85 |
| | | Position of the oxidation loops, 93, 87, 88, 89 |
| | | Distribution of the general bypass streams, 82, 83, 84, 85 |
| Cavitation, oxidation | 2 | Air flow rate CA m$^3$/h |
| | | Distribution of the stream in the compartments of the reactor (opening of the valves in the lower part of the 4 active compartments) 82, 83, 84, 85 |
| Radical oxidation | 3 | Intensity at the reactor terminals 90, 91, 92, 94 EL in A/cm$^2$ |
| | | Active surface SA in m$^2$ per EL reactor |
| | | Localization of the EL reactors in the loops 93, 87, 88, 89 |
| | | Flow rate of the recirculations through the reactors, speed of the fluid, 82, 83, 84, 84. |
| Phase separation | 4 | Introduction of the oxidation compartments 72 to 75 |
| | | Coagulation, PD1, flow rate l/h |
| | | Flocculation, PD2, flow rate l/h |
| | | Skimming, VR speed of rotation of the skimming device |

For the whole of the device, the residence time varies, as a function of the effluent treated, from 30 minutes to a few hours, 3 or 4 hours for example.

The effluent therefore arrives into the last compartment after having benefited from a vertical flow in each preceding compartment and therefore having had a maximum residence time and an optimum contact time.

An example of purification is given below with the device described in reference to FIG. 11 for water loaded with organic matter (low loading) and inorganic matter (very variable chlorides).

Figure 12:
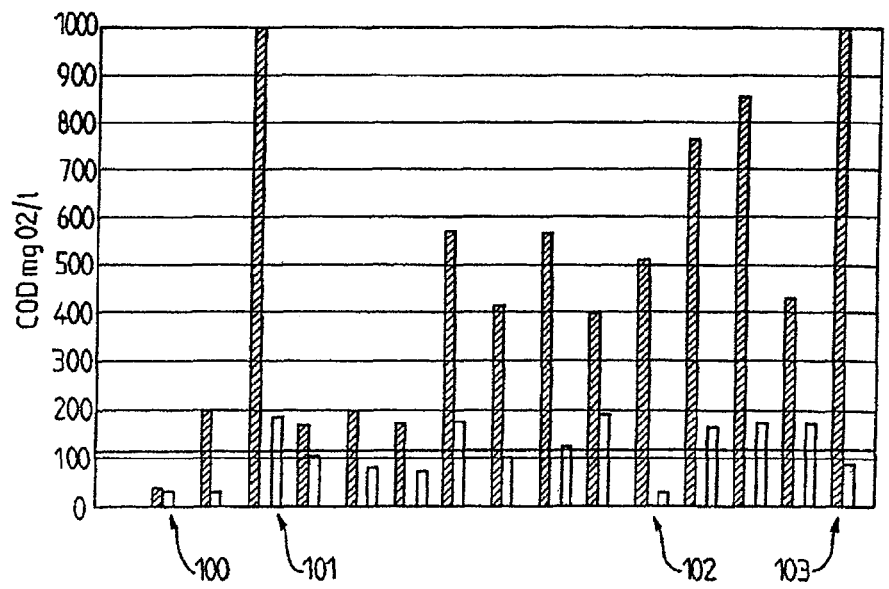

This is a very specific effluent of great variability:
seawater mixed with crude hydrocarbons
wide variety of crude products
low COD that varies from 30 to 3000 ppm
predominantly soluble COD
chlorides (NaCl, MgCl, CaCl$_2$, etc.) that vary from 3 (dilution) to 30 g/l The results obtained are given in FIG. 12, the hatched zone giving the effluent before treatment, and the clear zone after treatment.

It is observed here that the initial conditions for the effluent 100 are very different from the effluent 101, or else 102 or 103.

Figure 14:
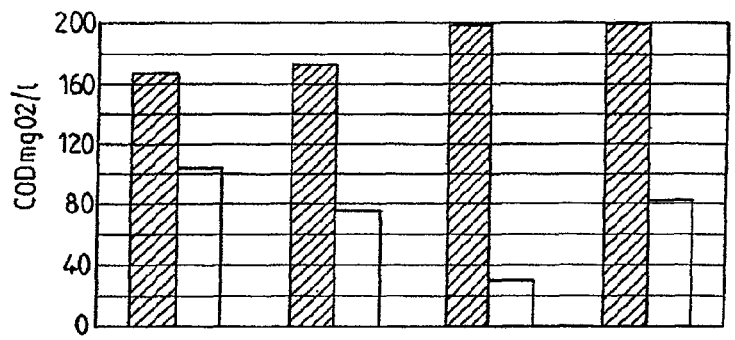
Figure 15:
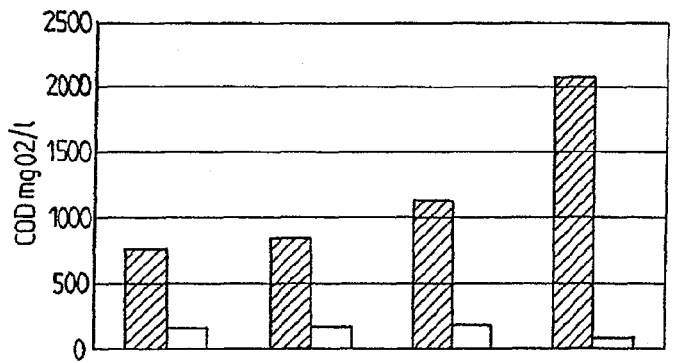

Three other examples of results are also given with reference to tables VII, VIII and IX below and the FIGS. 13 to 15, that show that even with a wide variability in the initial COD values, the invention makes it possible to obtain results where the final COD value is below a given value, this being with one and the same installation.

Figure 13:
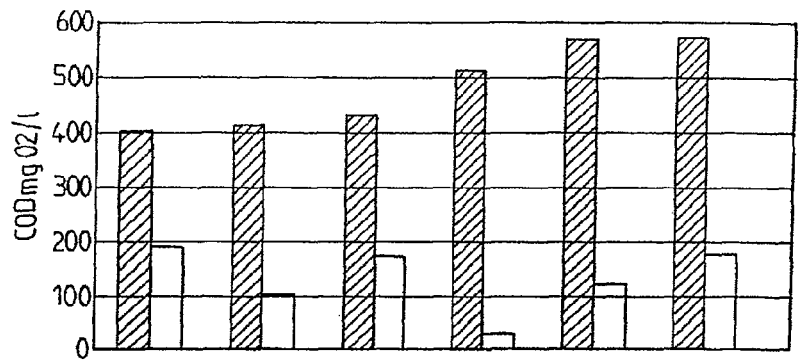

Table VII corresponds to FIG. 13 (average initial COD).
Table VIII corresponds to FIG. 14 (low initial COD).
Table IX corresponds to FIG. 15 (higher initial COD).

TABLE VII

| Parameters | 1 | 2 | 3 | 4 | 5 | 6 |
|---|---|---|---|---|---|---|
| Operation | Batch | Batch | Batch | Batch | Batch | Batch |
| Residence time (hours) | 7 | 8 | 7 | 9 | 8 | 8 |
| Surface area of electrodes ($m^2$) | 4 | 4 | 4 | 4 | 4 | 4 |
| Intensity/reactor (A) | 150 | 200 | 125 | 250 | 250 | 150 |
| Flow rate P1 ($m^3/h$) | 20 | 20 | 30 | 30 | 30 | 20 |
| Flow rate P4 ($m^3/h$) | 10 | 10 | 10 | 10 | 10 | 10 |
| Skimming rate (rpm) | 1 | 1 | 1.5 | 1.5 | 1 | 1 |
| Coagulant injection ppm/timing | 15 ppm startup 5 ppm in middle of cycle | 10 ppm startup 10 ppm in middle of cycle | 20 ppm startup 5 ppm in middle of cycle | 20 ppm startup 5 ppm in middle of cycle | 20 ppm startup 10 ppm in middle of cycle | 20 ppm startup 10 ppm in middle of cycle |
| Flocculant injection ppm/timing | 2 ppm startup 2 ppm in middle of cycle | 5 ppm startup 3 ppm in middle of cycle | 2 ppm startup 1 ppm in middle of cycle | 3 ppm startup 1 ppm in middle of cycle | 1 ppm startup 1 ppm in middle of cycle | 1 ppm startup 1 ppm in middle of cycle |
| Cavitation | 65% | 50% | 50% | 50% | 50% | 65% |
| Position of oxidation on general bypass (G) or particular bypass ($C_i$) | G + C4 General bypass and bypass over 4th compartment | G + C4 General bypass and bypass over 4th compartment | G + C4 General bypass and bypass over 4th compartment | G + C4 General bypass and bypass over 4th compartment | G + C4 General bypass and bypass over 4th compartment | G + C4 General bypass and bypass over 4th compartment |

TABLE VIII

| Parameters | 1 | 2 | 3 | 4 |
|---|---|---|---|---|
| Operation | Batch | Batch | Batch | Batch |
| Residence time (hours) | 7 | 8 | 8 | 9 |
| Surface area of electrodes ($m^2$) | 4 | 4 | 4 | 4 |
| Intensity/reactor (A) | 150 | 150 | 200 | 150 |
| Flow rate P1 ($m^3/h$) | 205 | 20 | 30 | 30 |
| Flow rate P4 ($m^3/h$) | 10 | 10 | 10 | 10 |
| Skimming rate (rpm) | 1 | 1 | 1.5 | 1.5 |
| Coagulant injection ppm/timing | 20 ppm startup 10 ppm in middle of cycle | 10 ppm startup 10 ppm in middle of cycle | 20 ppm startup 10 ppm in middle of cycle | 20 ppm startup 20 ppm in middle of cycle |
| Flocculant injection ppm/timing | 2 ppm startup 2 ppm in middle of cycle | 5 ppm startup 3 ppm in middle of cycle | 2 ppm startup 1 ppm in middle of cycle | 3 ppm startup 1 ppm in middle of cycle |
| Cavitation | 50% | 50% | 50% | 50% |
| Position of oxidation on general bypass or particular bypass i | G + C4 General bypass and bypass over 4th compartment | G + C4 General bypass and bypass over 4th compartment | G + C4 General bypass and bypass over 4th compartment | G + C4 General bypass and bypass over 4th compartment |

TABLE IX

| Parameters | 1 | 2 | 3 | 4 |
|---|---|---|---|---|
| Operation | Batch | Batch | Batch | Batch |
| Residence time (hours) | 7.30 | 8 | 8 h 30 | 9 |
| Surface area of electrodes ($m^2$) | 4 | 4 | 4 | 4 |
| Intensity/reactor (A) | 50 | 75 | 200 | 100 |
| Flow rate P1 ($m^3/h$) | 35 | 20 | 30 | 40 |
| Flow rate P4 ($m^3/h$) | 10 | 10 | 10 | 10 |
| Skimming rate (rpm) | 1 | 2 | 1 | 2 |

TABLE IX-continued

| Parameters | 1 | 2 | 3 | 4 |
|---|---|---|---|---|
| Coagulant injection ppm/timing | 20 ppm startup 10 ppm in middle of cycle | 10 ppm startup 10 ppm in middle of cycle | 20 ppm startup 10 ppm in middle of cycle | 20 ppm startup 10 ppm in middle of cycle |
| Flocculant injection ppm/timing | 2 ppm startup 1 ppm in middle of cycle | 2 ppm startup 2 ppm in middle of cycle | 2 ppm startup 1 ppm in middle of cycle | 3 ppm startup 2 ppm in middle of cycle |
| Cavitation | 50% | 50% | 50% | 100% |
| Position of oxidation on general bypass or particular bypass i | G + C4 General bypass and bypass over 4th compartment | G + C4 General bypass and bypass over 4th compartment | G + C4 General bypass and bypass over 4th compartment | G + C4 General bypass and bypass over 4th compartment |

It goes without saying that a person skilled in the art, depending on the effluents to be treated, will adapt the size of the various bubbles at the start and the oxidation flow rate(s) so as to obtain the desired COD, this being by successive improvement, if necessary, at the time of presetting the installation during the startup before its industrial exploitation, in a known manner.

As it goes without saying and as results also from the foregoing, the present invention is not limited to the embodiments more particularly described. It embraces, on the contrary, all the variants thereof and especially those where, for example, the chamber is not cylindrical or else where the sludge is discharged by suction and not by scraping.

The invention claimed is:

1. A method for purifying liquid effluents charged with dissolved or undissolved organic and/or mineral substances, in order to bring them below a given COD threshold, in which the water is separated from the substances by carrying out, in one and the same vertical chamber (3) that has at least two compartments, a vertical bubbling in the effluents introduced at a flow rate d, and simultaneously in the same chamber a hydraulic or gaseous chemical oxidation of said effluents, characterized in that the chamber (3) having a free surface and comprising at least three compartments (4, 5, 6, 7) that communicate with one another in order to allow a circulation between compartments successively from the top to the bottom and from the bottom to the top and so on, the effluents are introduced on one side and are withdrawn from another side in the upper part of the chamber at said flow rate d, the effluents are circulated by means of an external hydraulic circuit (26) through the compartments between their lower part and a middle level at an overall flow rate D at least three times higher than the flow rate d, and the supernatant phase is continuously discharged, the rate of chemical oxidation and also the flow rate and the size of the bubbles being selected in order to gradually obtain a separation of solid/liquid and/or liquid/liquid phases at the surface of the chamber that makes it possible to obtain a COD below the given threshold.

2. The method as claimed in claim 1, characterized in that the chemical oxidant is, alone or in combination, chosen from the oxidants $H_2O_2$, $O_3$, $O°$ or $OH°$.

3. The method as claimed in claim 2, characterized in that the chemical oxidant is injected into a circuit in by-pass with one of the compartments.

4. The method as claimed in claim 1, characterized in that the supernatant phase is continuously discharged by scraping in the upper part of floating sludge into an overflow compartment (8).

5. The method as claimed in claim 1, characterized in that the chemical oxidation is mainly carried out in the last compartment (7) for circulation of the effluents of the chamber.

6. The method as claimed in claim 1, characterized in that the chemical oxidation comprises a bubbling of microbubbles obtained by electrolysis known as nano-bubbling.

7. The method as claimed in claim 6, characterized in that the nano-bubbling is obtained by circulating a portion of the recycled effluents to parallel flat electrodes that produce radical substances at the surface of said electrodes.

8. The method as claimed in claim 6, characterized in that the nano-bubbling flow rate is between 2 d and 15 d.

9. The method as claimed in claim 1, characterized in that the flow rate D for circulating effluents through the compartments is greater than 10 times the flow rate d.

10. The method as claimed in claim 1, characterized in that the bubbling is carried out with air, the average size of the bubbles when they are emitted being between 0.5 mm and 5 mm.

11. The method as claimed in claim 1, characterized in that the vertical bubbling is obtained by cavitation in the effluent circulation circuit.

12. The method as claimed in claim 1, characterized in that the flow D is reinjected in the lower part of one or more of the compartments.

13. The method as claimed claim 1, characterized in that the vertical hydraulic regime in the chamber (3) is selected so that the lower part is in a highly turbulent regime ($Re \gg 3000$ $m^2.s^{-1}$) and the upper part near the free surface is in laminar regime ($Re < 2000$ $m^2.s^{-1}$).

14. The method as claimed in claim 1, characterized in that a complementary agitation is carried out at high flow rate in one or more of the compartments by recirculation via a bypass circuit attached to the compartment in question.

15. The method as claimed in claim 14, characterized in that a complementary oxidation is furthermore carried out in the bypass circuit.

16. The method as claimed in claim 1, characterized in that it furthermore comprises a biological filtration.

17. A purifying device (1) for liquid effluents charged with dissolved or undissolved organic and/or mineral substances, in order to bring them below a given COD threshold, comprising a vertical chamber (3) that has at least two adjacent vertical compartments (4, 5, 6, 7) that communicate with one another, means for supplying air for vertical bubbling in the lower part of the compartments, means (29) for introducing effluents on one side and means (34) for withdrawing them from another side in the upper part of the chamber at a flow rate d, and means (37) for supplying said effluents with fluid for hydraulic or gaseous chemical oxidation, characterized in that the chamber has at least three compartments that communicate with one another via one or more openings (22, 23, 24) made in a wall on the one hand at their lower part or on the other hand at a middle level, in order to allow a circulation between compartments successively from the top to the bottom and from the bottom to the top and so on, means (20) for circulating the effluents, via an external hydraulic circuit (29) between the openings in the lower part of the walls and those at a middle level at a flow rate D at least three times greater than the flow rate d, means for continuously discharging the supernatant phase, and control means (19) that make it possible to adjust the rate of chemical oxidation and also the flow rate and size of the bubbles in order to obtain a separation of solid/liquid and/or liquid/liquid phase of the effluents at the surface of the chamber that makes it possible to obtain a COD below the given threshold.

18. The device as claimed in claim 17, characterized in that it has five compartments (4, 5, 6, 7, 8) including four (4, 5, 6, 7) for circulation of the effluents and one (8) for discharging the floating sludge.

19. The device as claimed in claim 17, characterized in that the compartments have a working height between 2 m and 6 m.

20. The device as claimed in claim 17, characterized in that the ratio of the working height H to the section S of each compartment is between 4 and 10.

21. The device as claimed in claim 17, characterized in that the chemical oxidation is carried out by producing hydroxyl free radicals OH° from the water molecule $H_2O$ via an electrolysis technique.

22. The device as claimed in claim 17, characterized in that the air bubbles for vertical bubbling are produced in the circuit (20) for circulating effluents via cavitation means.

23. The device as claimed in claim 17, characterized in that at least one compartment comprises a bypass circuit which is attached to it for high flow rate recirculation.

24. The device as claimed in claim 23, characterized in that the bypass circuit comprises complementary means for oxidation via electrolysis.

25. The device as claimed in claim 17, characterized in that it furthermore comprises means for treatment via biological filtration.

\* \* \* \* \*

UNITED STATES PATENT AND TRADEMARK OFFICE
CERTIFICATE OF CORRECTION

PATENT NO.       : 8,366,938 B2                                                         Page 1 of 1
APPLICATION NO. : 12/595058
DATED            : February 5, 2013
INVENTOR(S)      : Capeau et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 786 days.

Signed and Sealed this
First Day of September, 2015

Michelle K. Lee
*Director of the United States Patent and Trademark Office*